United States Patent Office 3,255,174
Patented June 7, 1966

3,255,174
7-O-METHYL-N-ACYL-3,4-O-ISOPROPYLIDENE-
1-DEOXY-LINCOSAMINES
Brian Bannister, Kalamazoo, and Herman Hoeksema,
Cooper Township, Kalamazoo County, Mich., assignors
to The Upjohn Company, Kalamazoo, Mich., a corporation of Delaware
No Drawing. Filed Apr. 13, 1964, Ser. No. 359,448
2 Claims. (Cl. 260—210)

The present invention relates to novel organic compounds and is more particularly concerned with 7-O-methyl - N - acyl-3,4-O-isopropylidene-1-deoxylincosamines [6 - acylamino - 1,6,8 - trideoxy - 3,4-O-isopropylidene - 7 - O - methyl - D - erythro - D - galactooctopyranoses] (IV) and a method for the preparation thereof.

The novel compounds of this invention and the process for the production thereof can be illustratively represented in the following manner:

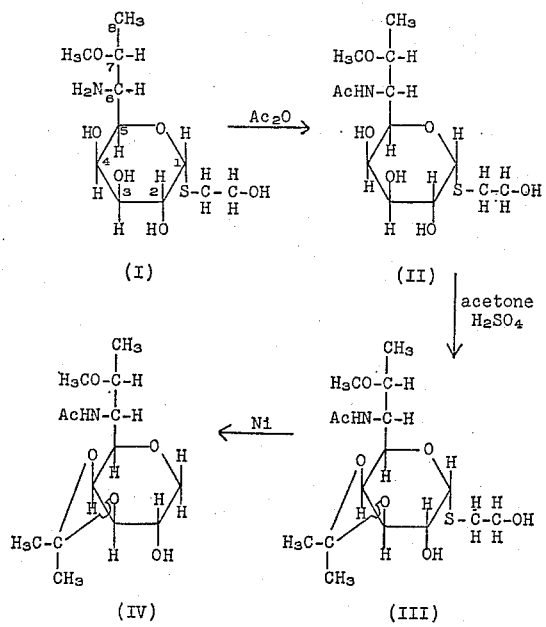

wherein Ac is the acyl radical of a hydrocarbon carboxylic acid containing from 2 to 12 carbon atoms, inclusive.

The process of the present invention comprises: acylating with an acid anhydride or acyl chloride of a hydrocarbon carboxylic acid containing from 2 to 12 carbon atoms, inclusive, 2-hydroxyethyl thiocelestosaminide [2-hydroxyethyl 6 - amino - 6,8 - dideoxy - 7 - O - methyl-1 - thio - D - erythro - D - galacto - octopyranoside] (I) to obtain a 2-hydroxyethyl N-acylthiocelestosaminide [2-hydroxyethyl 6 - acylamino - 6,8 - dideoxy - 7 - O-methyl - 1 - thio - D - erythro - D - galacto - octopyranoside] (II); treating II with acetone in the presence of an acid catalyst, e.g., sulfuric acid or p-toluenesulfonic acid, to obtain the 3,4-O-isopropylidene derivative (III); and treating III with active nickel to obtain the desired 7 - O - methyl - N - acyl - 3,4 - O - isopropylidene-1-deoxylincosamine [N - acyl - 3,4 - O - isopropylidene-1-deoxycelestosamine] (IV).

The novel compounds, 7 - O - methyl - N - acyl - 3,4-O-isopropylidene-1-deoxylincosamines, are compounds highly active against a number of microorganisms, such as Trichophyton rubrum, Pseudomonas fluorescens, and others. The antimicrobial activity of 7-O-methyl-N-acetyl-3,4-O-isopropylidene-1-deoxylincosamine can be utilized for washing equipment in hospitals, homes, and microbiological laboratories, and for washing medical and surgical instruments as well as clothing used in laboratories specializing in cultivation of microorganisms. Also, it can be used to wash floors, walls and ceilings in locations where sterile backgrounds are necessary.

The starting material of Formula I is produced as shown in the preparations.

In carrying out the process of the present invention, hydroxyethyl thiocelestosaminide is treated with an acylating agent, such as the anhydride of a hydrocarbon carboxylic acid or the acyl chloride or acyl bromide of a hydrocarbon carboxylic acid; the anhydrides are preferred. The acylation is generally carried out in a lower alkanol, such as methanol, ethanol, 2-propanol, 1-propanol, butyl alcohol, t-butyl alcohol, or the like. The temperature of the reaction can be between —20 and +50° C.; preferably between 0° C. and room temperature, about 30° C. Higher temperatures are operative; however, acylation of some of the hydroxy groups may occur and yields would therefore be lower. In the preferred embodiment of this invention the reaction is carried out at about room temperature or below with only a slight excess of acid anhydride present. If, instead of an acid anhydride, acyl chlorides are used, the preferred solvent is triethylamine, which can accept the liberated hydrogen chloride. Other amines, like pyridine, may also be used.

The product (II) resulting from this acylation can be isolated by conventional methods, such as by evaporating the solvent or by pouring the reaction mixture into water and extracting with a solvent. If necessary, the amide of Formula II can be purified by conventional means such as recrystallization.

Product II is converted to the 3,4-O-isopropylidene derivative by dissolving it in a large excess of acetone in the presence of an acid catalyst, such as from 0.1 to 5% by weight of a strong acid, for example, sulfuric acid, perchloric acid, or toluenesulfonic acid. This reaction is carried out generally at room temperature, but temperatures between 0° C. and the boiling point of the reaction mixture are operative. After a period of about 2 hours, the reaction mixture is usually neutralized and the product obtained by conventional means, such as by evaporating the solvent, after removal of the salt formed from the catalyst and the neutralizing agent. The product can be further purified, if desired, by conventional means, such as recrystallization from organic solvents.

Compound III is converted to the desired product, 7-O-methyl-N-acyl-3,4-isopropylidene - 1 - deoxylincosamine (IV), by refluxing III with an active nickel catalyst in a lower alkanol. As the lower alkanol, methanol, ethanol, 1-propanol, 2-propanol, 1-butanol, isobutyl alcohol, and the like are used, and as active nickel catalyst, Raney nickel is preferred. In the preferred embodiment of this invention, the Raney nickel is used in large excess and the reaction mixture is heated to reflux; however, lower temperatures can be used. After termination of the reaction, the product (IV) is obtained by conventional procedures, such as extraction, counter current distribution, and the like, as shown in more detail in the examples. After the product has been isolated, it can be purified by crystallization from organic solvents.

The following preparations and examples are illustrative of the process and products of the present invention, but are not to be construed as limiting.

PREPARATION 1

*2-hydroxyethyl thiocelestosaminide hydrazine solvate*

A mixture of 5 gm. (0.0094 mole) of celesticetin (Example 3, U.S. Patent 2,928,844) and 25 ml. (excess) of hydrazine hydrate was heated under reflux for 21 hours. The excess hydrazine was removed by distillation in vacuo and the residue was crystallized from 35 ml. of absolute ethanol. White crystals (1.2 gm.) of 2-hydroxyethyl thiocelestosaminide hydrazine solvate were obtained which melted at 98–108° C. Recrystallization from absolute ethanol gave 0.65 gm. having an optical rotation of $[\alpha]_D^{25}$ +243° (c.=0.8, water); an infrared absorption spectrum in Nujol mull at the following frequencies: 3400, 1630, 1600, 1460, 1450 (sh), 1305, 1275, 1260, 1200, 1115, 1085, 1055, 1010, 978, 950, 925, 910, 873, 800–820, 705, 690, and 680 cm.$^{-1}$; an equivalent weight of 161 with two basic groups having pKa's in the region of 7.5; and the following elemental analysis:

*Analysis.*—Calcd. for $C_{11}H_{23}NO_6S \cdot N_2H_4$: C, 40.11; H, 8.26; N, 12.76; S, 9.74. Found: C, 40.15; H, 8.04; N, 11.69; S, 9.56.

PREPARATION 2

*2-hydroxyethyl thiocelestosaminide hydrazine solvate*

Desalicetin (Example 1, U.S. Patent 2,851,463) (10 gm.) was dissolved in hydrazine hydrate (100 cc.) and heated under reflux in an oil bath at 165° C. for 18 hours. The almost colorless solution was concentrated to dryness on a steam bath, first at fifteen mm. and finally at less than 1 mm., giving a solid residue which was slurried with acetonitrile, filtered, and washed with the same solvent. Crystallization from ethanol gave colorless needles (2.64 gm.) of 2-hydroxyethyl thiocelestosaminide hydrazine solvate. Recrystallization from the same solvent gave crystals of 2-hydroxyethyl thiocelestosaminide hydrazine solvate which had an equivalent weight of 168 with two basic groups having pKa's in the region of 7.5; an optical rotation of $[\alpha]_D^{25}$ +248° (c.=1, 95% ethanol); and the following elemental analysis:

*Analysis.*—Calcd. for $C_{11}H_{23}NO_6S \cdot N_2H_4$: C, 40.11; H, 8.26; N, 12.76; S, 9.74. Found: C. 40.27; H, 7.95; N, 11.63; S, 9.80.

The IR spectrum showed identity of this product with that obtained in Preparation 1.

PREPARATION 3

*2-hydroxyethyl thiocelestosaminide*

A solution of 2 gm. of 2-hydroxyethyl thiocelestosaminide hydrazine solvate in 30 ml. of dimethylformamide was concentrated to a volume of about 10 ml. and then diluted with 10 ml. of dimethylformamide. Ether was added until cloudiness resulted, and 500 mg. of 2-hydroxyethyl thiocelestosaminide was deposited. The crystalline 2-hydroxyethyl thiocelestosaminide had an optical rotation of $[\alpha]_D^{25}$ +262° (c.=1, in water); and infrared absorption spectrum at the following frequencies: 3400 (sh), 3250, 1600, 1400, 1325, 1310, 1290, 1240, 1195, 1160, 1150 (sh), 1110, 1100, 1075, 1045, 1038, 1005, 980, 920, 895, 862, 825, 796, 740, 711, and 690 cm.$^{-1}$; an equivalent weight of 297; pKa of 7.2; and the following elemental analysis:

*Analysis.*—Calcd. for $C_{11}H_{23}NO_6S$: C, 44.43; H, 7.80; N, 4.71; S, 10.78. Found: C, 44.20; H, 7.78; N, 4.97; S, 10.68.

EXAMPLE 1

*7-O-methyl-N-acetyl-3,4-O-isopropylidene-1-deoxylincosamine*

To a solution of 14 g. (0.047 mole) of 2-hydroxyethyl thiocelestosaminide in 150 ml. of ethanol was added 14 ml. of acetic anhydride. The reaction mixture was stirred for ½ hour, refrigerated overnight, and evaporated to dryness in vacuo. The residue, 2-hydroxyethyl N-acetyl-thiocelestosaminide, was slurried with ether and dried under reduced pressure.

The thus-obtained dried material was dissolved in 1500 ml. of acetone and 15 ml. of concentrated sulfuric acid was added to the solution with stirring. The mixture was stirred for about 2 hours and then neutralized by adding dry ammonia. The mixture was filtered and the filtrate was evaporated to dryness, leaving 2-hydroxyethyl N-acetyl-3,4-O-isopropylidenethiocelestosaminide as an oil.

The oil was dissolved in 500 ml. of ethanol, 150 ml. of loosely-packed Raney nickel in ethanol was added thereto, and the mixture was heated under reflux for 10 hours. Thereafter the mixture was filtered, the catalyst was washed with 1 liter of boiling ethanol and the combined filtrate and washings were evaporated to dryness. An oil resulted which was distributed (500 transfers) in the system 1-butanol:water. A peak fraction, K=0.82, obtained by evaporation of pooled tubes 200–250, gave 4.6 g. (33%) of 7-O-methyl-N-acetyl-3,4-O-isopropylidene-1-deoxylincosamine which crystallized upon drying; melting point, 198–205° C., rotation $[\alpha]_D^{25}$ +71° (c.=1, 50% ethanol).

*Analysis.*—Calcd. for $C_{14}H_{25}NO_6$: C, 55.43; H, 8.31; N, 4.62; methoxyl, 10.63. Found: C, 55.03; H, 8.28; N, 4.70; methoxyl, 10.43.

EXAMPLE 2

*7-O-methyl-N-propionyl-3,4-O-isopropylidene-1-deoxylincosamine*

In the manner given in Example 1, 2-hydroxyethyl thiocelestosaminide was reacted in ethanol solution with propionic anhydride to give 2-hydroxyethyl N-propionyl-thiocelestosaminide (II, Ac=propionyl). This compound was reacted with acetone containing 2% concentrated sulfuric acid to give the isopropylidene derivative of II, a compound of structural formula III wherein Ac is propionyl; this latter compound (III) was thereupon treated with Raney nickel in ethanol at the boiling point for 10 hours to give 7-O-methyl-N-propionyl-3,4-O-isopropylidene-1-deoxylincosamine.

In the manner given in Example 1, but using instead of acetic anhydride:

(a) Butyric anhydride results in 7-O-methyl-N-butyryl-3,4-O-isopropylidene-1-deoxylincosamine;

(b) Valeric anhydride resulted in 7-O-methyl-N-valeryl-3,4-O-isopropylidene-1-deoxylincosamine;

(c) Hexanonic anhydride resulted in 7-O-methyl-N-hexanoyl-3,4-O-isopropylidene-1-deoxylincosamine;

(d) Benzoic anhydride resulted in 7-O-methyl-N-benzoyl-3,4-O-isopropylidene-1-deoxylincosamine;

(e) Phenylacetic anhydride resulted in 7-O-methyl-N-phenylacetyl-3,4-O-isopropylidene-1-deoxylincosamine;

(f) Phenylpropionic anhydride resulted in 7-O-methyl-N-phenylpropionyl-3,4-O-isopropylidene - 1 - deoxylincosamine.

EXAMPLE 3

*7-O-methyl-N-lauroyl-3,4-O-isopropylidene-1-deoxylincosamine*

Five grams of a suspension of 2-hydroxyethyl thiocelestosaminide in 100 ml. of triethylamine was cooled to about 10° C. and to this suspension was added 5 ml. of lauroyl chloride. The mixture was kept at about 0 to −5° C. overnight and then diluted with 25 ml. of ether. The liquids were decanted, and the remaining material was concentrated to dryness, washed with a small quantity of water to remove triethylamine hydrochloride and recrystallized repeatedly from acetone:ethanol to give the N-lauroyl derivative of 2-hydroxyethyl thiocelestosaminide (II, Ac=lauroyl). This compound was submitted as in Example 1 to the reaction with acetone in the presence of concentrated sulfuric acid, and the resulting 3,4-O-isopropylidene derivative (III. Ac=lauroyl) was boiled with Raney nickel in ethanol to give the desired 7-O-methyl-N-lauroyl-3,4-O-isopropylidene-1-deoxylincosamine.

In the manner given in Example 3, using instead of lauroyl chloride, heptanoyl, octanoyl, nonanoyl, decanoyl, undecanoyl chloride, or the like, produces the corresponding 7-O-methyl - N - acyl-3,4-O-isopropylidene-1-deoxylincosamine in which the acyl is heptanoyl, octanoyl, nonanoyl, decanoyl, undecanoyl, or the like.

We claim:
1. A compound of the structural formula

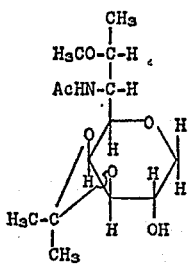

wherein Ac is the acyl radical of a hydrocarbon carboxlic acid containing from 2 to 12 carbon atoms, inclusive.

2. 7-O-methyl-N-acetyl - 3,4-O-isopropylidene-1-deoxy-lincosamine.

References Cited by the Examiner

UNITED STATES PATENTS 2,895,988 7/1959 Archer et al. _____ 260—211
3,076,024 1/1963 Larsen _____ 260—211

OTHER REFERENCES

Creighton et al., "J. Chem. Soc.," 1960, pages 1024–1029.

Hall et al., "J. Chem. Soc.," 1961, pages 1537–1545.

Stanek et al., "The Monosaccharides," 1963, pages 374, 505–506 and 509, Academic Press, New York, N.Y.

LEWIS GOTTS, *Primary Examiner.*

JOHNNIE R. BROWN, *Assistant Examiner.*